(12) United States Patent
Wilkinson (10) Patent No.: US 9,084,516 B2
(45) Date of Patent: Jul. 21, 2015

(54) JOINT SYSTEM FOR THE MANUFACTURING OF A SHOWER CUBICLE

(75) Inventor: Andrew David Wilkinson, Harrogate (GB)

(73) Assignee: Taplanes Limited, North Yorkshire (GB)

( * ) Notice: Subject to any disclaimer, the term of this patent is extended or adjusted under 35 U.S.C. 154(b) by 506 days.

(21) Appl. No.: 12/602,063

(22) PCT Filed: Mar. 17, 2008

(86) PCT No.: PCT/GB2008/050187
§ 371 (c)(1),
(2), (4) Date: Mar. 30, 2010

(87) PCT Pub. No.: WO2008/146031
PCT Pub. Date: Dec. 4, 2008

(65) Prior Publication Data
US 2011/0056014 A1    Mar. 10, 2011

(30) Foreign Application Priority Data
May 31, 2007    (GB) .................................. 0710323.7

(51) Int. Cl.
*E04B 2/00*    (2006.01)
*A47K 3/16*    (2006.01)
*A47K 3/30*    (2006.01)
*A47K 3/28*    (2006.01)
*E04B 2/08*    (2006.01)
*F16B 5/00*    (2006.01)

(52) U.S. Cl.
CPC . *A47K 3/30* (2013.01); *A47K 3/284* (2013.01); *F16B 5/0012* (2013.01); *Y10T 29/49826* (2013.01)

(58) Field of Classification Search
USPC ............................................................. 52/35
See application file for complete search history.

(56) References Cited

U.S. PATENT DOCUMENTS

| 584,277 | A | * | 6/1897 | Tyler | 403/364 |
| 1,212,262 | A | * | 1/1917 | Rockwell | 403/364 |
| 1,272,131 | A | * | 7/1918 | Silberg | 403/340 |
| 1,398,695 | A | * | 11/1921 | Hull | 52/286 |

(Continued)

FOREIGN PATENT DOCUMENTS

| CN | 1451071 | 10/2003 |
| DE | 19503948 | 8/1996 |

(Continued)

OTHER PUBLICATIONS

International Search Report issued in related International Application PCT/GB2008/050187 filed Mar. 17, 2008.

*Primary Examiner* — Charles A Fox
*Assistant Examiner* — Joseph J Sadlon
(74) *Attorney, Agent, or Firm* — Downs Rachlin Martin PLLC (57) ABSTRACT

The invention relates to a joint system for providing a joint between two sections of material. The joint system comprises a projection section (30) and a recess section (32) of respective sections of material to be joined. The projection and recess sections (30, 32) are adapted to interengage. The projection section (30) comprises at least two engagement portions (34, 36, 38, 40). Each engagement portion is either a male engagement portion (34, 38) or a female engagement portion (36, 40). The recess section (32) comprises at least two engagement portions adapted to engage the engagement portions of the projection section (30).

5 Claims, 7 Drawing Sheets

(56) References Cited

U.S. PATENT DOCUMENTS

| | | | | |
|---|---|---|---|---|
| 1,413,395 | A | * | 4/1922 | Donnelly .................... 403/340 |
| 2,648,409 | A | * | 8/1953 | Daugherty et al. ............ 52/264 |
| 3,007,213 | A | * | 11/1961 | Hobbs ...................... 52/287.1 |
| 3,149,347 | A | | 9/1964 | Embroden |
| 3,281,172 | A | * | 10/1966 | Kuehl ...................... 52/592.1 |
| 3,299,270 | A | * | 1/1967 | Avella ..................... 250/517.1 |
| 3,355,195 | A | * | 11/1967 | Takayanagi et al. .......... 403/364 |
| 3,382,635 | A | | 5/1968 | O'Gara Venard et al. |
| 4,557,091 | A | * | 12/1985 | Auer ........................ 52/282.3 |
| 5,303,519 | A | * | 4/1994 | Mustee et al. ................ 52/35 |
| 5,337,525 | A | * | 8/1994 | Zaccai et al. ................ 52/35 |
| 5,425,210 | A | | 6/1995 | Zafir |
| 5,899,251 | A | * | 5/1999 | Turner ...................... 144/347 |
| 6,101,778 | A | * | 8/2000 | Mårtensson ................ 52/582.1 |
| 6,209,278 | B1 | | 4/2001 | Tychsen |
| 6,217,251 | B1 | * | 4/2001 | Kato et al. .................. 403/341 |
| 6,332,733 | B1 | * | 12/2001 | Hamberger et al. ......... 403/329 |
| 6,418,683 | B1 | * | 7/2002 | Martensson et al. ........ 52/282.1 |
| 6,497,079 | B1 | | 12/2002 | Steinwender et al. |
| 6,505,452 | B1 | * | 1/2003 | Hannig et al. ............. 52/582.1 |
| 6,546,691 | B2 | * | 4/2003 | Leopolder ................. 52/747.1 |
| 6,647,689 | B2 | * | 11/2003 | Pletzer et al. ............. 52/592.1 |
| 6,862,857 | B2 | * | 3/2005 | Tychsen ................... 52/582.1 |
| 7,040,068 | B2 | * | 5/2006 | Moriau et al. ............. 52/591.3 |
| 7,537,030 | B2 | * | 5/2009 | Gallant ...................... 141/18 |
| 7,621,094 | B2 | * | 11/2009 | Moriau et al. ............. 52/588.1 |
| 8,307,582 | B2 | * | 11/2012 | Cook .......................... 52/35 |
| 8,375,673 | B2 | * | 2/2013 | Evjen ...................... 52/592.1 |
| 2004/0079131 | A1 | | 4/2004 | Perruccio |
| 2005/0166516 | A1 | * | 8/2005 | Pervan ..................... 52/589.1 |
| 2005/0247000 | A1 | | 11/2005 | Zhu |
| 2009/0049787 | A1 | * | 2/2009 | Hannig .................... 52/589.1 |

FOREIGN PATENT DOCUMENTS

| | | | |
|---|---|---|---|
| DE | 20018284 U1 | | 1/2001 |
| DE | 202006015942 U1 | | 2/2007 |
| EP | 594096 | | 4/1994 |
| GB | 2325678 | | 12/1998 |
| GB | 2421179 | | 6/2006 |
| GB | 2421179 A | * | 6/2006 |
| JP | 55077519 | | 6/1980 |
| JP | 2002021310 | | 1/2002 |

* cited by examiner

JOINT SYSTEM FOR THE MANUFACTURING OF A SHOWER CUBICLE

This invention relates to a method of manufacturing a shower cubicle or shower pod. In particular, the invention relates to a method of manufacturing a shower cubicle or pod using a water-tight joint.

Shower cubicles, shower enclosures and shower pods, comprising a shower, sink and toilet, are available in a range of shapes, sizes and finished states. For example, shower cubicles may be delivered from the manufacturer fully built or may require assembly or construction on-site.

Shower cubicles and pods which are delivered fully built and need only to be fixed in place suffer from the disadvantage that they are often heavy and bulky. Shower pods, in particular, are often constructed from concrete. This makes movement of the shower cubicle or pod difficult and presents problems when fitting the cubicle or pod in place, because it is difficult to make small adjustments to the unit.

Shower cubicles and shower enclosures which require construction on-site often suffer similar disadvantages. For example, the cubicles or enclosures can be difficult to assemble and may require a great deal of time to ensure each part is correctly fitted. They may also suffer from a disadvantage that the joints formed between each section in the construction of the shower cubicle or enclosure are not water-tight and must be sealed prior to use. Even then, sealant life is limited and the joints may require re-sealing several times during the lifetime of the shower enclosure or cubicle.

The types of shower cubicle and enclosure described above are usually constructed from materials such as glass fibre, styrene or a composite material, such as a stone composite. Such materials may not have a long lifespan. Therefore, the use of such materials means that the shower cubicle or enclosure may fail within five to ten years of initial construction and, therefore, may require replacement or maintenance after a relatively short period.

It is an object of the present invention to overcome these and other problems associated with the prior art.

According to a first aspect of the present invention, there is provided a joint system for providing a joint between two sections of material, the joint system comprising a projection section and a recess section of respective sections of material to be joined, the projection and recess sections being adapted to interengage, wherein the projection section comprises at least two engagement portions, each engagement portion being either a male engagement portion or a female engagement portion, and the recess section comprises at least two engagement portions adapted to engage the engagement portions of the projection section.

Preferably, the joint system is operable to join together sections of material in the construction of a shower cubicle or pod. Preferably, the sections of material are sheets of material. Preferably, the joint system is a shower cubicle or pod joint system. More preferably, the sections of material form modules of a modular shower cubicle or pod.

Preferably, the projection section and the recess section of the joint system each comprise at least one male engagement portion and at least one female engagement portion.

Preferably, the projection section and the recess section each comprise one male engagement portion and one female engagement portion.

Preferably, each female engagement portion of the joint system is adapted to receive a corresponding male engagement portion of the joint system.

Preferably, the sections of material are sections of a plastics material. Preferably, the plastics material is a polypropylene. The polypropylene may be a copolymer polypropylene. The sections of material may be of any suitable size, and preferably, may be variable in size depending on the desired use or location of the finished product.

The joint system may comprise spindle moulded edges of the sections of material.

The joint system, once engaged, may be supportable by tension straps adapted to prevent the joints being pushed out of place by a user. The joint system, once engaged, may be further reinforcable by a mechanical system, preferably comprising outwardly extending protrusions on either side of the joint system adapted to be secured together.

Alternatively, the joint system, once engaged, may be reinforcable using a welding process.

The joint system may be used in the manufacture of a modular shower cubicle or pod. Preferably, when used in the manufacture of a modular shower cubicle or pod, the joint system is formed between horizontal modules of the shower cubicle or pod adapted to be placed on top of each other. The joint system allows sections of the shower cubicle or pod to be replaced easily if required, without the whole cubicle or pod being replaced.

According to a second aspect of the present invention, there is provided a bending tool operable to bend a sheet of material about a predetermined angle, the bending tool comprising at least two table sections, at least one of the table sections being adapted to rotate from a first position to a second position about an axis of the bending tool, and securing means for securing a sheet of material to be bent.

Preferably, the bending tool comprises two table sections. Preferably, one table section is fixed in place, and the second table section is adapted to rotate about an axis of the bending tool.

Preferably, at least one table section is provided with securing means. Preferably, each table section is provided with securing means.

Preferably, the securing means comprises a vacuum pump. Preferably, the sheet of material to be bent is secured in place by suction from the vacuum pump. Preferably, the surfaces of the table sections comprise a grooved grid system along which the suction from the vacuum pump may act.

Preferably, the two table sections are adjacent to each other and are substantially coplanar when the second table section is in the first position. The second table section is preferably adapted to rotate about an axis located between the table sections. Preferably, the second table section is connected to the fixed table section by a hinge.

Preferably, the second table section is adapted to be moved manually. Preferably, the second table has a handle to enable the manual movement thereof.

In the second position, the second table section may form a pre-determined angle of between approximately 0° to approximately 180° C. with respect to the fixed table.

Alternatively, the second table section may be adapted to be moved mechanically by an automated process.

Preferably, the sheet of material to be bent is a sheet of a plastics material. Preferably, the plastics material is a polypropylene material. The polypropylene may be a copolymer polypropylene.

The sheet of material may be treated along the desired bend line to facilitate the bending thereof. This treatment may include heating the material to soften the bend line or removing an outer protective film from the material if present.

Preferably, the sheet of material comprises a V groove along the desired bend line.

The bending tool may be used in the manufacture of a modular shower cubicle or pod. Preferably, when used in the manufacture of a modular shower cubicle or pod, the bending tool forms bends in sheets of material which eventually form the corners of horizontal modules of the shower cubicle or pod.

According to a third aspect of the present invention, there is provided a welding process for providing a weld between adjoining surfaces along a bend in a sheet of material or a join between at least two surfaces of at least one sheet of material, the welding process comprising:

a) positioning a tacking nozzle on an area of material to be welded;

b) feeding a filler rod into the tacking nozzle;

c) supplying a hot, inert gas along the tacking nozzle to the filler rod and the surface of the material to be welded; and    d) moving the tacking nozzle over the whole area to be welded thus attaching the filler rod to the surface of the material.

Preferably, the or each sheet of material is a sheet of a plastics material. Preferably, the plastics material is a polypropylene. The polypropylene may be a copolymer polypropylene.

The filler rod is preferably the same material as the sheet of material. Preferably, the filler rod is a polypropylene rod. The filler rod is applied to provide greater strength and stability to the welded surface.

Preferably, the inert gas used in step b) is nitrogen gas. However, any other inert gas may be used. The use of an inert gas such as nitrogen prevents any contamination of the weld which may cause premature failure of the weld. The gas displaces any air present at the weld surface which may cause oxidation of the material.

Preferably, the welding process is performed along a bend line in a sheet of material. The bend line may be formed along a V groove in the sheet of material. Preferably, the welding process draws together the edges of the V groove.

Preferably, the tacking nozzle is held at an angle to the bent sheet of material. Preferably, the tacking nozzle is held at an angle of between approximately 10° and approximately 90° to the bent sheet.

The welding process may be used on multiple bend lines in a single sheet of material.

Preferably, the welding process is carried out by hand. Alternatively, the welding process may be performed by a machine.

The welding process may be used in the manufacture of a shower cubicle or pod.

Alternatively, the bend lines may be tacked instead of being welded.

Therefore, according to a fourth aspect of the present invention, there is provided a tacking process for securing adjoining surfaces along a bend in a sheet of material or a join between at least two surfaces of at least one sheet of material, the tacking process comprising:

a) positioning a tacking nozzle on an area of material to be tacked;

b) supplying a hot, inert gas along the tacking nozzle to the surface of the material to be tacked; and    c) moving the tacking nozzle over the whole area to be tacked thus melting and fusing the surfaces of the material together.

According to a fifth aspect of the present invention, there is provided a method of manufacture of a modular shower cubicle or pod comprising the steps of:

a) producing at least two shower cubicle or pod modules by:

i) preparing at least two sheets of material;

ii) spindle moulding at least one edge of each of the sheets of material to create a joint system for fixing the modules together;

iii) bending the sheets of material along predetermined lines to form corners of the modules; and    b) fabricating the shower cubicle by securing the modules together using the joint system.

Preferably, the step of preparing the at least two sheets of material comprises the step of machining the material using a CNC machine of the type known in the art.

Preferably, the sheets of material are sheets of a plastics material. Preferably, the plastics material is a polypropylene. The polypropylene may be a copolymer polypropylene.

Preferably, the sheets of material are heat sealed, tacked and/or welded along the bend lines. The welding process gives extra stability and strength to the modules.

Preferably, the sheets of material are bent using a bending tool as hereinbefore described.

Preferably, the spindle moulding step produces a joint system as hereinbefore described.

Preferably, the sheets of material are welded or tacked according to the welding and tacking processes as hereinbefore described.

The invention extends to a shower cubicle produced according to the fifth aspect of the present invention.

The invention further extends to a tool for a spindle moulder machine operable to cut a profiled joint system according to the first aspect of the present invention.

All of the features described herein may be combined with any of the above aspects, in any combination.

An embodiment of the invention will now be further described, by way of example only, with reference to the accompanying drawings, in which:

FIG. 6b shows a schematic plan view of a bend made in the sheet of material of FIG. 6a;

Figures 1A, 1B:
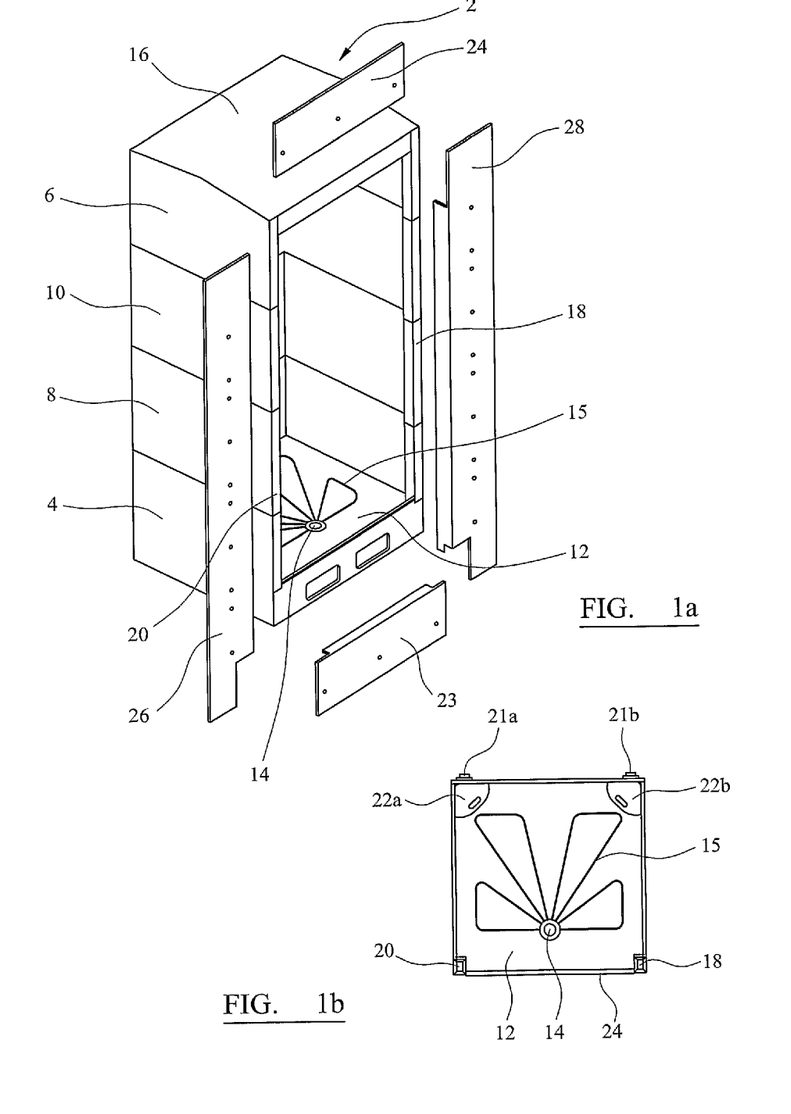
FIG. 1a shows a schematic perspective view of a modular shower cubicle according to the invention.
FIG. 1b shows a plan view of the modular shower cubicle of FIG. 1a with the ceiling removed.

Referring now to FIGS. 1a and 1b, a modular shower cubicle 2 comprises a base module 4, a roof module 6 and two central modules 8,10. The modules are made of a polypropylene material. The polypropylene has a minimum thickness of 9 mm to ensure that the finished product is able to absorb heavy impact.

The base module 4 comprises a shower tray 12 having a drain 14 and a grooved non-slip surface 15. The base module 4 also comprises a lower portion of the walls of the cubicle 2.

The roof module 6 comprises the uppermost portions of the walls of the cubicle 2 and a ceiling 16. The ceiling 16 may comprise holes or cut-outs for receiving an extractor fan or light fitting.

The central modules 8,10 and roof module 6 may further comprise holes or cut-outs for receiving pipe work, supports and/or controls for a shower.

Joint systems are formed between adjoining modules of the shower cubicle 2. Specifically, a joint system is formed between each of the upper edge of the base module 4 and the lower edge of the lower central module 8, the upper edge of the lower central module 8 and the lower edge of the upper central module 10, and the upper edge of the upper central module 10 and the lower edge of the roof module 6. The joint systems will be described in further detail in relation to FIG. 2.

Each of the modules has a box section 18,20 forming either side of an entrance of the cubicle 2. These box sections 18,20 provide extra support and stability to the shower cubicle 2 once assembled. The box sections 18,20 may be reinforced by plates (not shown) which are affixed to the rear of the box sections 18,20. The plates may be screwed to the box sections 18,20. The plates may be polypropylene plates, stainless steel plates or aluminium plates.

The base module 4 and two central modules 8,10 are secured together using tension straps 21a,b. These straps 21a,b are affixed to the base module 4 and the upper central module 10 on the outer surface of one wall of the cubicle 2. The tension straps 21a,b prevent the modules 4,8,10 being displaced or lifted off each other in normal use of the cubicle 2, but may be undone to allow modules to be repaired or replaced.

Two ledges (not shown) are welded to the internal corners of the upper edge of the upper central module 10. Corresponding ledges 22a,b are welded in the internal corners of the roof module 6 at the lower edge thereof. The corresponding ledges on the upper central module 10 and the roof module 6 are screwed together to secure the upper central module 10 to the roof module 6 of the shower cubicle 2. The ledges 22a,b form useful platforms/soap dishes on which to place items to be used in the shower.

Fascias 23,24,26,28, shower rails and curtains and/or doors are secured to the shower cubicle 2 as desired.

Figure 2:
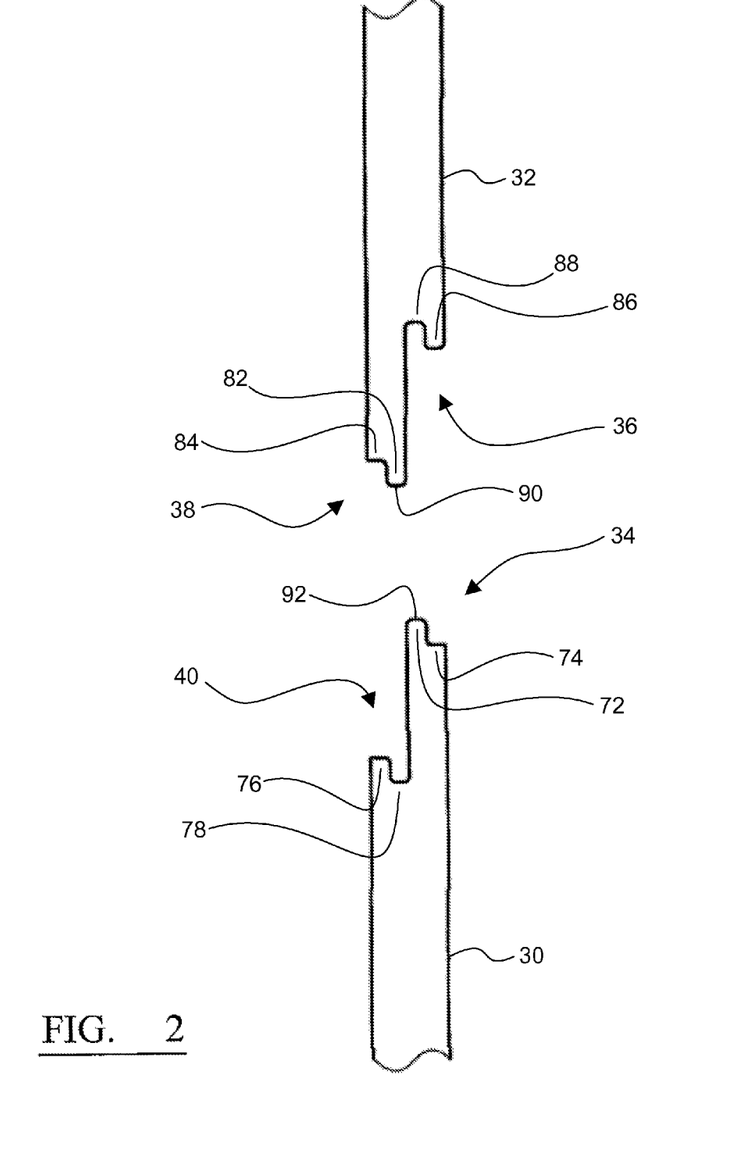
FIG. 2 shows a schematic plan view of a joint system according to the invention.
Figure 3A:
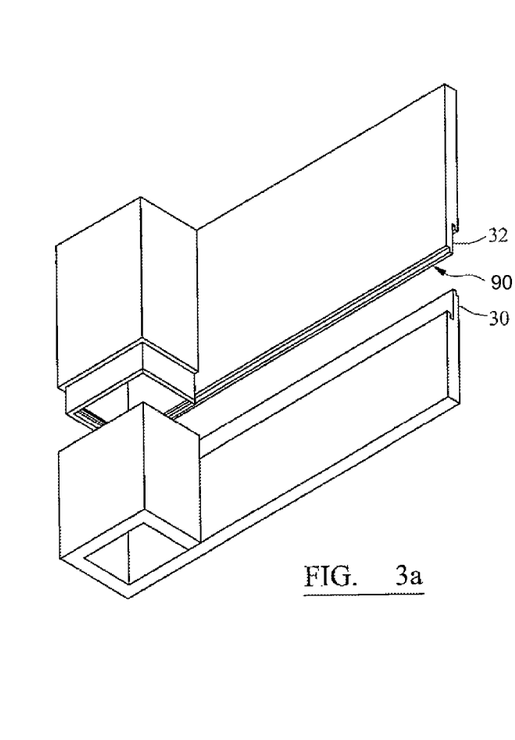
FIGS. 3a, b and c show schematic perspective views of a joint system according to the present invention.
Figure 3B:
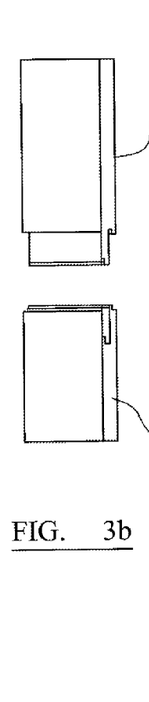
Figure 3C:
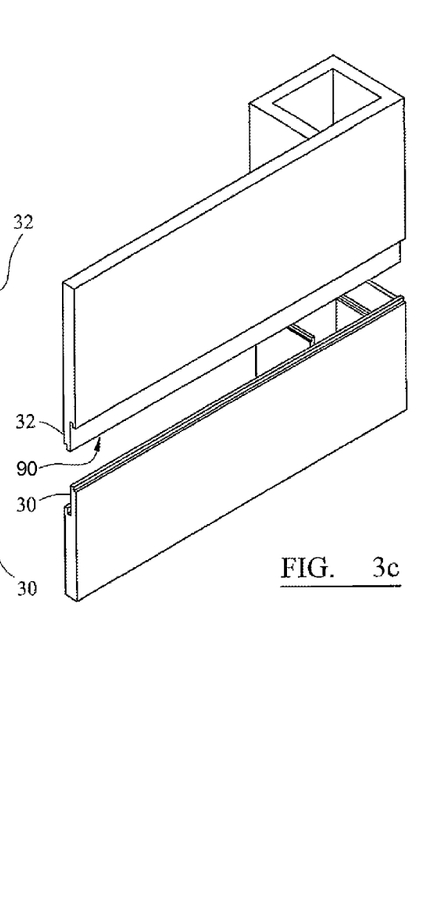

Referring now to FIGS. 2 and 3a, b and c, each joint system comprises a projection section 30 (also referred to as an upper edge portion) on the lower module (also referred to as a lower section) and a recess section 32 (also referred to as a lower edge portion) on the upper module (also referred to as an upper section). Each section 30,32 has both male 34,38 and female 36,40 engagement portions. Notably, as shown in FIG. 2, projection section 30 and recess section 32 are complimentary in shape, are shaped substantially identically, are adapted to interengage, and are configured to mate with one another when the projection section and recess section are placed in opposition. Male engagement portion 34 of projection section 30 further includes a male engagement subcomponent 72 and a female engagement subcomponent 74, and female engagement portion 40 of the projection section further includes a male engagement subcomponent 76 and a female engagement subcomponent 78. Similarly, male engagement portion 38 of recess section 32 further includes a male engagement subcomponent 82 and a female engagement subcomponent 84, and female engagement portion 36 of the recess section further includes a male engagement subcomponent 86 and a female engagement subcomponent 88. As shown in FIG. 2, male engagement portion 34 and male engagement subcomponent 72 of projection section 30 both extend in a first direction. Similarly, male engagement portion 38 and male engagement subcomponent 82 of recess section 32 both extend in a second direction, which is opposite to the first direction when the projection section 30 and recess section 32 are placed in opposition (as shown in FIG. 2). Male engagement subcomponent 82 of recess section 32 further includes a lower edge 90 (also referred to as a lower-most surface) and male engagement subcomponent 72 of projection section 30 further includes an upper edge 92 (also referred to as an upper-most surface).

Lower edge 90 of male engagement portion 38 of the joint system is formed on the inside of the shower cubicle 2 thus preventing leaks and/or water movement by capillary action through the joint.

Edges associated with male 38 and female 40 engagement portions of the joint system which are located on the inner surfaces of the modules are beveled. This prevents any sharp edges on the inside of the shower cubicle 2 once assembled.

Figure 4A:
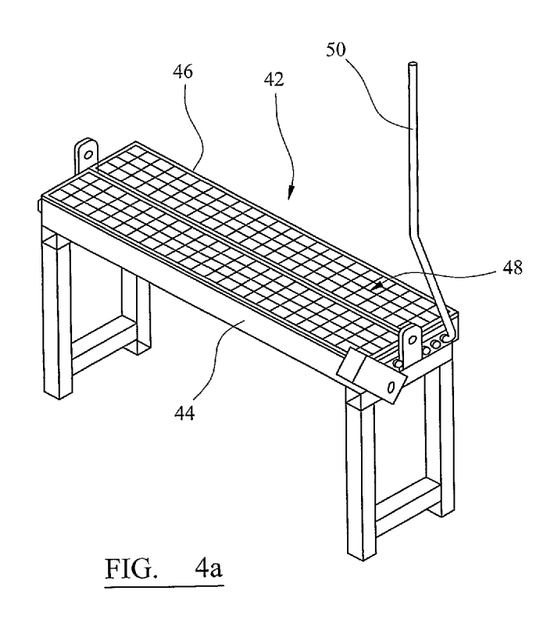
FIGS. 4a and b show schematic perspective views of a bending tool according to the invention in a first and second position respectively.
Figure 4B:
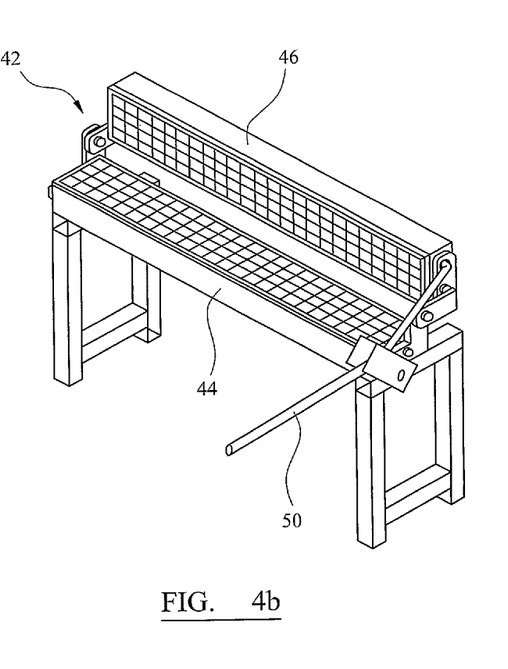

Referring to FIGS. 4a and b, a bending tool, or bending jig, 42 comprises two tables 44,46. The first table 44 is static. The second table 46 is hingedly connected to the first table 44 and is movable from a flat position substantially coplanar to the first table 44 up to an angle of between 0° and 180° to the first table 44.

Vacuum pumps (not shown) are connected to each table 44,46 to provide a vacuum to hold sheets of material to be bent in place on the tables. The surfaces of both tables 44,46 comprise a grooved grid 48 through which the vacuum acts. Latex rubber seals (not shown) inserted into the grooved grids 48 provide seals between the tables 44,46 and material to be bent to ensure that the vacuum acts efficiently.

A handle 50 is provided to move the second table 46.

The process for the manufacture of a modular shower cubicle 2 is initiated on a customer request and design. The design is drawn up on a computer and inspected for any obviously required alterations. Should no alterations be required, the design is translated from the computer design code into CNC machine code. Should alterations be required, these are made prior to the design being translated into CNC machine code.

The CNC machine code is inspected for errors, and dispatched to a CNC machine console. The CNC machine is of the kind known in the art. The CNC machine cuts the profile of each sheet of polypropylene required for the construction of the modules 4,6,8,10 of the shower cubicle 2, along with pre-drilling holes for any required screws and/or fitments, and creating 'U' channels and 'V' grooves 60 to facilitate further processing of the polypropylene.

The pre-drilling and cutting for fitments and other finishing profiles ensures that the work for the installer of the shower cubicle is minimised and simplified. The 'U' channels and 'V' grooves 60 and some other pre-drilling allows for the bending or fabrication process to be accurate, and results in a product which is consistent throughout the production process.

After the polypropylene has been profiled by the CNC machine, the profiled sections are fed into a spindle moulder machine. The spindle moulder machine comprises a male/female cutting tool and allows joint sections to be formed along the desired edges of each section by first feeding the section through the machine to cut the profile of a projection section 30 along one edge of the section, then turning the section over to cut the profile of a recess section 32 on the opposite edge. The projection and recess sections 30,32 form the joint system as described above with reference to FIG. 2.

Figure 6A:
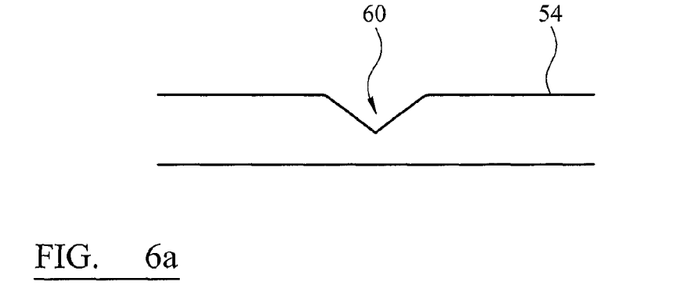
FIG. 6a shows a schematic plan view of a V groove in a sheet of material according to the present invention.
Figure 6B:
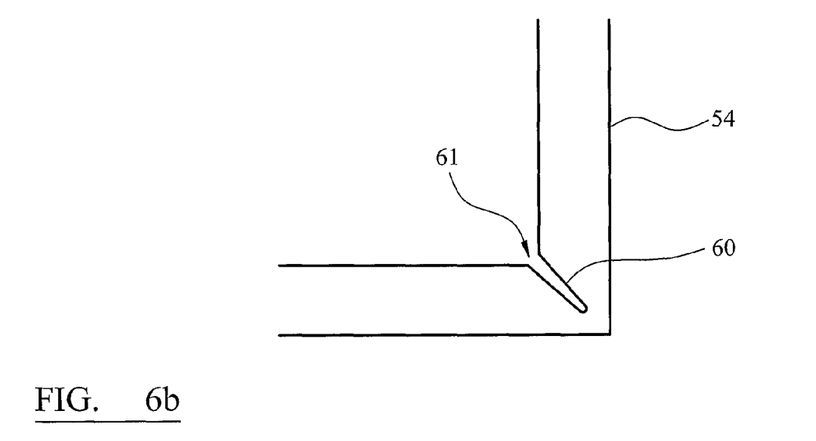
Figure 6C:
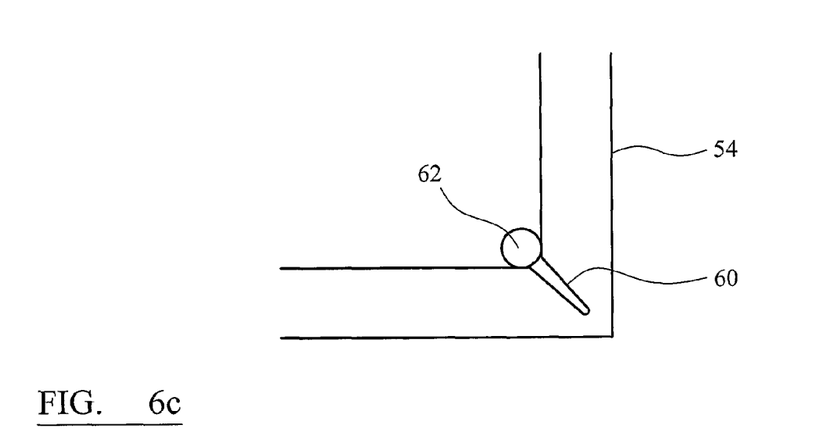
FIG. 6c shows a schematic plan view of a seam made along the bend of FIG. 6b.

Once the sections of polypropylene 54 have been profiled by the spindle moulder, bends are created along the 'V' grooves 60 as shown in FIGS. 6a, b and c using the bending tool 42.

A section of polypropylene 54 is laid flat on the two tables 44,46 of the bending tool with a 'V' groove 60 positioned along the gap between the two tables 44,46 and the vacuum is applied. The second table 46 is manually rotated into its desired position thus bending the material 54 along the 'V' groove 60 and closing the 'V' on itself. This process creates the corners 64,66,68*a,b,c,d* of the shower cubicle module.

Figure 5:
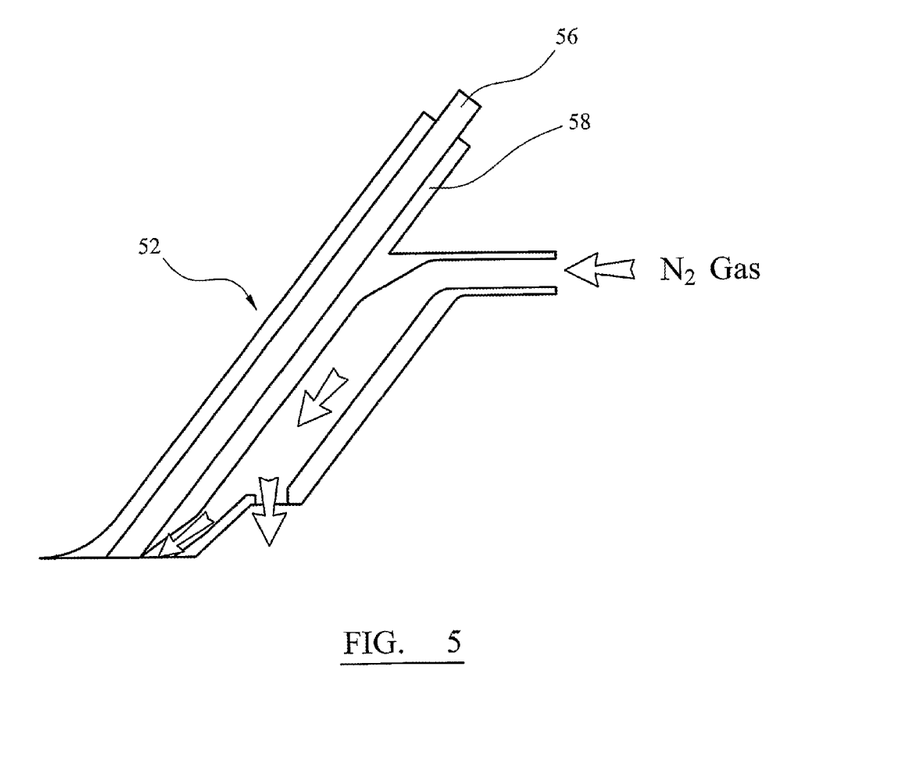
FIG. 5 shows a schematic cross-sectional view of a tacking nozzle according to the invention.
Figure 7:
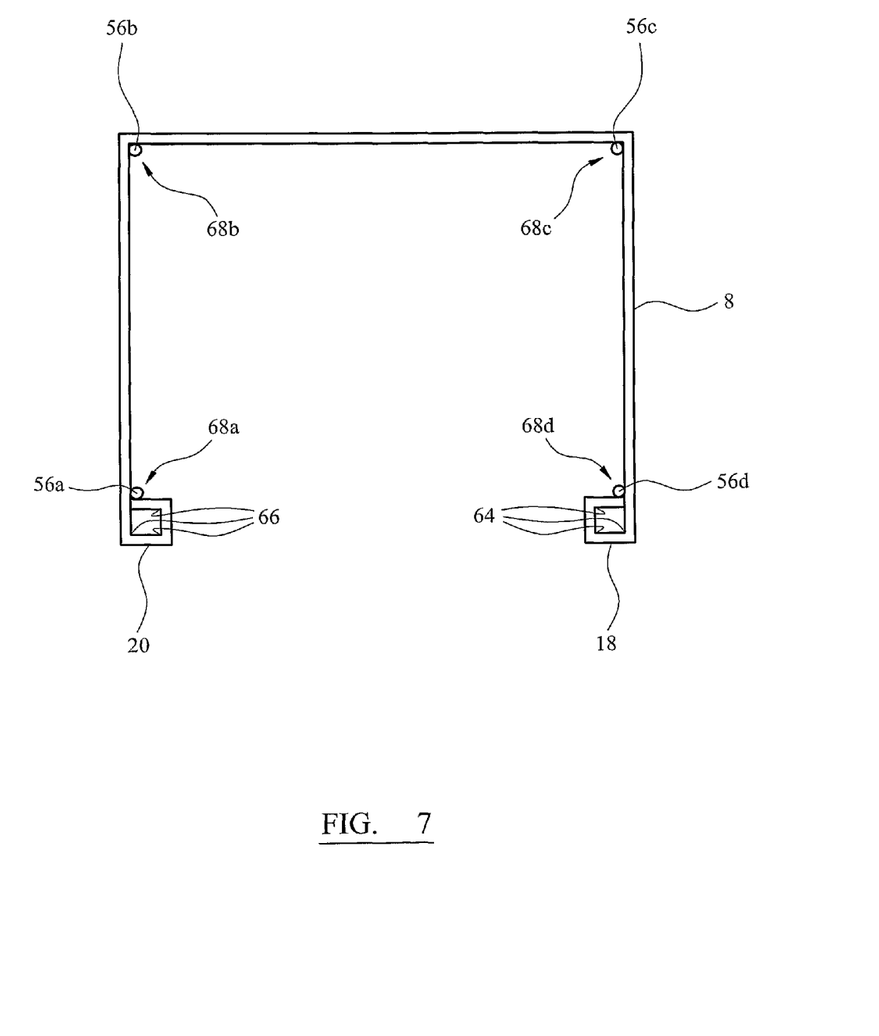
FIG. 7 shows a schematic plan view of a central module of a modular shower cubicle according to the present invention.

The bend 61 created by the bending tool 42 is then secured and strengthened by welding or tacking using the tacking nozzle as shown in FIG. 5. A combination of heat, pressure and nitrogen gas is used to create a heavy-duty plastic seam 62.

Where a seam 62 will be seen in use, i.e. seams 68*a,b,c,d* as shown in FIG. 7, a tacking nozzle 52 comprising a heating element is applied to the surface to create a weld along the seam. A thin rod of polypropylene 56 is inserted into the receiving portion 58 of the tacking nozzle 52 and is fed down the nozzle 52, along with nitrogen gas, to the surface to be welded. The hot tacking nozzle 52 is then moved along the surface to be welded.

The nitrogen gas displaces any air which could cause corrosion of the polypropylene, and the heat and pressure of the tacking nozzle 52 causes the surface of the polypropylene to be melted, drawing the two sides of the 'V' together and securing the join with the polypropylene rod 56*a,b,c,d* as shown in FIG. 7.

Where the seam 62 is not seen in use, i.e. seams 64 and 66 which create the box sections 18,20 as shown in FIG. 7, the seam is just tacked using the hot tacking nozzle 52 and nitrogen gas as described above without a polypropylene rod.

Once a seam 62 has been formed along a bend 61, the second table 46 is then repositioned, the vacuum removed and the section of material 54 is repositioned for the next bend and weld or tack.

Each section of polypropylene, once processed as described above, forms a horizontal module 4,6,8,10 of the shower cubicle 2. The shower cubicle 2 is then constructed by securing the modules 4,6,8,10 together using the joint system, tension straps 21*a,b* and ledges 22*a,b* as described above.

The shower cubicles described above may be formed in any suitable shape, and may include further features, for example, seats and/or drying areas.

The material used in the manufacture of the shower cubicle is a type of polypropylene specially formulated to reject bacterial growth or adhesion. The molecular structure of the polypropylene used allows strong water-tight welds to be formed between sections of the shower cubicle, thus eliminating the need for additional structures or seals using other materials in the production of the shower cubicle.

The joint system allows a shower cubicle to be broken down into horizontal sections as shown in FIG. 5. The sections are each of a manageable size, enabling the shower cubicle to be easily located and constructed, particularly on refurbishment sites.

The joint system according to the present invention also allows a modular shower cubicle to be produced without having to seal each module together to produce a water tight finish. The arrangement of the joint system with the lower edge of the joint being on the inside of the cubicle means there is no capillary action or creep of water across the joint. Further, the bevelled edges of the joint system on the inside of the cubicle prevent ensures that there are no sharp edges inside the cubicle. Therefore, no injuries are sustained by a user using a shower cubicle according to the present invention.

The extremely strong weld formed according to the present invention is all that is required to hold each module of the shower cubicle together. In addition, the weld creates a join which is water-tight and may be easily wiped clean.

The shower cubicle produced according to the invention has improved strength and durability due to the solid structure of the welded joints and the forgiving qualities of the polypropylene material. The thick material making up the main structure of the modules absorbs any heavy impact, and when punctured or scratched, it maintains the same surface.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A modular shower cubicle comprising a joint system for providing a joint between two sections of material, the joint system comprising:
    a lower section and an upper section of respective sections of material to be joined;
    wherein, in use, the upper section is positioned above and is complementary in shape to the lower section, the lower and upper sections being adapted to interengage;
    wherein the lower section comprises two engagement portions, the engagement portions being a male engagement portion and a female engagement portion, and the upper section comprises corresponding male and female engagement portions adapted to engage the engagement portions of the lower section; and
    wherein the male engagement portion of the lower section includes male and female engagement sub-components, the male engagement portion of the lower section and male engagement sub-component both extending in a first direction wherein the lower section includes a lower-most surface and wherein the first direction is perpendicular to the lower-most surface.

2. A modular shower cubicle as claimed in claim 1, wherein the sections of material are sheets of material.

3. A modular shower cubicle as claimed in claim 1, wherein the shower cubicle includes an inner volume, wherein the female engagement sub-component forms a lower edge of the male engagement portion of the lower section, and wherein the lower edge is adjacent to the inner volume of the shower cubicle.

4. A modular shower cubicle as claimed in claim 3, wherein the lower edge is arranged and configured to prevent leaks and water movement by capillary action through the joint.

5. A modular shower cubicle as claimed in claim 1, wherein the shower cubicle includes an inner volume and wherein the upper and lower sections include beveled edges adjacent to the inner volume of the shower cubicle.

* * * * *